(12) United States Patent
Ruzica et al.

(10) Patent No.: US 10,378,548 B2
(45) Date of Patent: Aug. 13, 2019

(54) SUBMERSIBLE PUMP MOTOR HOUSING FOR IMPROVING THE SERVICEABILITY OF SUBMERSIBLE PUMPS

(71) Applicant: FLUID HANDLING LLC.

(72) Inventors: Paul J. Ruzica, Auburn, NY (US); Andrzej B. Pawelek, Camillus, NY (US); William A. Gell, III, Skaneateles, NY (US)

(73) Assignee: Fluid Handling LLC, Morton Grove, IL (US)

( * ) Notice: Subject to any disclaimer, the term of this patent is extended or adjusted under 35 U.S.C. 154(b) by 234 days.

(21) Appl. No.: 15/257,670

(22) Filed: Sep. 6, 2016

(65) Prior Publication Data

US 2017/0130725 A1    May 11, 2017

Related U.S. Application Data

(60) Provisional application No. 62/213,736, filed on Sep. 3, 2015.

(51) Int. Cl.
*H02K 11/00* (2016.01)
*F04D 25/06* (2006.01)
(Continued)

(52) U.S. Cl.
CPC ......... *F04D 25/0686* (2013.01); *H02K 5/132* (2013.01); *H02K 7/003* (2013.01); *H02K 11/0094* (2013.01)

(58) Field of Classification Search
CPC .............................................. H02K 5/04–225
(Continued)

(56) References Cited

U.S. PATENT DOCUMENTS 2,218,003 A * 10/1940 Hawley, Jr. ............ H02K 5/132
310/87
2,480,435 A    8/1949 Aspelin
(Continued)

FOREIGN PATENT DOCUMENTS

| CA | 1149501 A1 | 7/1983 |
|---|---|---|
| CN | 2391372 Y | 8/2000 |
| CN | 202550845 U | 11/2012 |

OTHER PUBLICATIONS

"Submersible Motor Control Boxes," Lockwell, web.archive.org, Sep. 18, 2015. https://web.archive.org/web/20150918054150/http://www.lockewell.com/pdf/franklin/franklin_control_box.pdf.
(Continued)

*Primary Examiner* — Alexander Talpalatski
(74) *Attorney, Agent, or Firm* — Ware, Fressola, Maguire & Barber LLP (57) ABSTRACT

A submersible pump is provided featuring: a motor; run/start capacitors having run/start capacitor connectors; a housing having a motor housing portion and a run/start capacitor housing portion separated by a housing wall, the motor housing portion having a motor housing chamber to receive/contain the motor and oil for immersing the motor in an oil bath, the run/start housing portion having a run/start housing chamber, the housing wall having connection ports to allow sealed connections between electrical components in the motor housing portion and the run/start capacitor housing portion; a removable motor housing cover to couple/close the motor housing portion; a removable run/start capacitor housing cover to couple/close the run/start capacitor housing portion; and a capacitive cup having a side wall portion and a bottom wall portion, to be removeably arranged in the run/start capacitor housing chamber, the bottom wall portion to mount the run/start capacitors to be contained/surrounded by the side wall portion, the bottom wall portion having
(Continued)

corresponding connection ports to allow the sealed connections between the run/start capacitor connectors and the electrical components in the motor housing portion in order to couple the run/start capacitors to the motor.

13 Claims, 5 Drawing Sheets

(51) Int. Cl.
*H02K 5/132* (2006.01)
*H02K 7/00* (2006.01)

(58) Field of Classification Search
USPC .................................................. 310/68 R, 89
See application file for complete search history.

(56) References Cited

U.S. PATENT DOCUMENTS

| | | | | |
|---|---|---|---|---|
| 2,539,048 | A * | 1/1951 | Arutunoff | F04D 13/083 310/166 |
| 2,662,206 | A * | 12/1953 | Schaefer | H02K 5/132 310/87 |
| 2,969,740 | A | 1/1961 | Kaatz | |
| 2,997,609 | A * | 8/1961 | Lung | H01H 29/20 200/81.9 HG |
| 3,085,513 | A * | 4/1963 | Zimmermann | H02K 5/132 310/172 |
| 3,248,582 | A | 4/1966 | Brown | |
| 3,457,866 | A | 7/1969 | Komor | |
| 3,457,867 | A | 7/1969 | Komor et al. | |
| 3,556,677 | A * | 1/1971 | Tremain | F04D 15/0218 200/83 R |
| 3,631,275 | A | 12/1971 | Conrad et al. | |
| 3,761,750 | A * | 9/1973 | Green | H02K 5/1285 310/87 |
| 4,218,195 | A | 8/1980 | Shure | |
| 4,523,899 | A | 6/1985 | Ouchi | |
| 4,546,300 | A | 10/1985 | Shaikh | |
| 4,614,904 | A * | 9/1986 | Yamazaki | H02P 1/44 310/87 |
| 5,094,591 | A | 3/1992 | Whitley et al. | |
| 5,207,562 | A | 5/1993 | Neibrook et al. | |
| 5,220,226 | A | 6/1993 | Long et al. | |
| 5,293,089 | A * | 3/1994 | Frister | H02K 9/19 310/114 |
| 5,860,792 | A | 1/1999 | Marks | |
| 6,022,196 | A | 2/2000 | Jensen et al. | |
| 6,081,056 | A * | 6/2000 | Takagi | H02K 5/08 310/216.137 |
| 6,927,522 | B2 * | 8/2005 | Skofljanec | H02K 23/66 310/239 |
| 6,989,620 | B2 * | 1/2006 | Nilson | H02K 11/01 310/164 |
| 7,091,638 | B2 | 8/2006 | Bevington | |
| 7,140,090 | B2 | 11/2006 | Williams et al. | |
| 7,579,727 | B2 | 8/2009 | Becker et al. | |
| 7,595,573 | B2 | 9/2009 | Watson et al. | |
| 7,999,423 | B2 * | 8/2011 | Asou | H02K 5/20 310/43 |
| 8,162,626 | B2 * | 4/2012 | Fukasaku | F04C 18/0215 417/410.1 |
| 8,633,623 | B2 * | 1/2014 | Bingler | F04B 17/03 310/43 |
| 8,636,482 | B2 | 1/2014 | Dolson | |
| 8,956,130 | B2 | 2/2015 | Buzit et al. | |
| 2011/0115313 | A1 | 5/2011 | Lee et al. | |
| 2014/0134013 | A1 | 5/2014 | Fath et al. | |
| 2014/0265659 | A1 * | 9/2014 | Chamberlin | H02K 5/20 310/54 |
| 2015/0115754 | A1 * | 4/2015 | Yamasaki | H02K 5/10 310/71 |

OTHER PUBLICATIONS

"Capacitor/Relay Packs," BARNES®, web.archive.org, Nov. 15, 2012. https://web.archive.org/web/20121115061241/http://www.cranepumps.com/downloadables/CATALOGS_OIPMs/BARNES/SUBACCES/BEA-04.PDF.
"Wel-Bilt™ 1in. Clear Water Pump," Owner's Manual, Northern Tool, Item # 109955, web.archive.org, Sep. 12, 2015. https://web.archive.org/web/20150912081054/http://www.northerntool.com/images/downloads/manuals/109955.pdf.
English language Abstract of CN2391372Y.
English language Abstract of CN202550845U.

* cited by examiner

SUBMERSIBLE PUMP MOTOR HOUSING FOR IMPROVING THE SERVICEABILITY OF SUBMERSIBLE PUMPS

CROSS-REFERENCE TO RELATED APPLICATION

This application claims benefit to provisional patent application Ser. No. 62/213,736, filed 3 Sep. 2015, which is hereby incorporated by reference in its entirety.

BACKGROUND OF THE INVENTION

1. Field of the Invention

The present invention relates to a pump motor housing; and more particularly relates to a submersible pump motor housing forming part of a submersible pump.

2. Brief Description of Related Art

In the prior art, pump assemblies are known having capacitor start and capacitor run motors which, as the name implies, are controlled by capacitors to increase the motor starting torque followed by energizing the secondary windings to maintain the magnetic field while the electric motor is running. These run and start capacitors may be captured within the housing of the electric motor or device in an oil bath environment. Defective start/run capacitors may prevent a motor from starting or remain running, creating excessive motor heat, leading to motor failure.

During a service operation, typically parts of such pump assembly that may be inspected or serviced include the start and or run capacitors, as well as start switches, motor mounting hardware, sealing gaskets, and a wiring harness for connecting above mentioned components to the electric motor. This combination of components may in whole or in part have to be removed and or replaced during the servicing operation. In current designs, the oil must be drained from the motor housing which contains at least some, if not all, of the aforementioned components so that they may be accessed for inspection, and then further accessed as to defect, removed, repaired, and or replaced.

There is a need in the industry for a better way to service such capacitor start and capacitor run motors, e.g., which solves at least some of the shortcomings of the known capacitor start and capacitor run motors.

SUMMARY OF THE INVENTION

In summary, the present invention provides a submersible pump motor housing assembly for using in conjunction with a submersible pump assembly, where the submersible pump motor housing assembly features containing the Start/Run capacitors in a dry and oil free environment. Electrical and visual inspection can be performed without removal of motor oil and if a blown capacitor is found, any leaking capacitor oil is contained, preventing contamination of motor oil.

In effect, the basic idea of the present invention is to make the top portion or some side portion of the submersible pump motor housing removable by using fasteners that can be reassembled afterward. This removable portion would allow access to the above components allowing for inspection or servicing assessment. This removable portion may be configured above the oil fill level inside the submersible pump motor housing so that draining or drawing down the oil is not necessary for the inspection, service assessment, or component(s) replacement to occur.

For example, the above components may be mounted in their own sealed compartment or chamber that separates them from the oil. The component compartment may be mounted above the oil fill line allowing for inspection and servicing assessment of capacitors, starters, and wiring harness without draining or drawing down the oil. This may or may not include a gasket for the removable portion. It is not necessary that they have their own compartment just that they are in position separate from the oil in the motor housing. Top, bottom, side, or below mounting of these components in relation to the motor are all captured in this basic idea. This compartment or area may include the power cord assembly connection.

The shape of the removable portion of the motor housing may be similar to a type of removable cap assembly or may be a removable port covering that allows access to the components. The other features of the pump, such as a handle or lifting eye, may be attached or integral to the cap or port design.

The connection mentioned above may be of permanent or quick connect design. The separate compartment may have an integral sealing ring to allow an oil tight seal to the motor housing. The separate compartment or area may consolidate all of the components or allow the components to be individually inspected and or replaced. The separate compartment may also be a component in and of itself inspectable and replaceable as an entire assembly. This may be due to the type of connections used that allow the compartment or now component to be quickly replaced with or without the use of tools.

A combination of materials may be used in the construction of this compartment such as plastic, rubber, and metal, but not inclusive of these materials.

Specific Embodiments

According to some embodiments, the present invention may feature, or take the form of a submersible pump motor housing assembly, e.g., for providing improved serviceability of a submersible pump, featuring the following combination:

a two-part housing having
  a first housing part with a motor housing portion and a pump motor component housing portion separated by a housing wall with sealable ports formed therein, the motor housing portion configured with a motor housing chamber to receive and contain a motor to be arranged therein with oil to be filled to an oil fill line, the pump motor component housing portion configured with a pump motor component housing chamber configured to receive and contain at least one pump motor housing component to be arranged therein, the sealable ports configured to pass electrical connections to be coupled from the at least one pump motor housing component through the housing wall to be connected to the motor to be arranged in the motor housing chamber of the motor housing portion; and
  a second removable housing part configured to detach from the pump motor component housing portion, e.g., including being arranged above the oil fill line when the motor housing chamber is filled with the oil, in order to insert the at least one pump motor housing component into the pump motor component housing chamber without draining the oil from the motor housing portion, and also configured to attach to the pump motor component housing portion in order to close the pump motor component housing chamber once the at least one pump motor housing component are inserted therein.

According to some embodiments of the present invention, the submersible pump motor housing assembly may also include one or more of the following features:

The at least one pump motor housing component may include at least one run and start capacitor combination that may need to be removed and replaced during servicing.

The at least one pump motor housing component may also include one or more of the following: at least one start switch, motor mounting hardware, sealing gaskets and a wiring harness for connecting some of pump motor housing component to the electric motor in the motor housing portion.

The pump motor component housing portion may include an upper flange forming a top opening for inserting and removing the at least one pump motor housing component; and the second removable housing part may include a removable housing cover configured to fasten to the upper flange to cover and seal the top opening after the at least one pump motor housing component is inserted into the pump motor component housing chamber.

The submersible pump motor housing assembly may form part of a pump assembly, including a vortex pump assembly having a pump; and the pump may be coupled to the motor via a motor shaft.

The submersible pump motor housing assembly may include the at least one pump motor housing component, e.g., including the at least one run and start capacitor combination, as well as one or more of the other components set forth herein.

The submersible pump motor housing assembly may include the motor arranged in the motor housing portion.

The submersible pump motor housing assembly may include the oil to be received and contained in the motor housing chamber for immersing the motor in an oil bath.

The submersible pump motor housing assembly may include a sealing agent for sealing the sealable ports of the housing wall, e.g., including where the sealing agent is a sealing fastener, coupler or grommet-like member affixed into the sealing port for sealing the motor housing chamber having the oil contained therein from the pump motor component housing chamber having the at least one pump motor housing component contained therein, while allowing an electric connection, cabling or conduit to pass through.

The first housing part may be made as an integral molded construction.

According to some embodiments, the submersible pump motor housing assembly may also include a capacitive cup configured to receive and contain the at least one pump motor housing component; and the pump motor component housing chamber may be configured to receive the capacitive cup when the second removable housing part is detached from the pump motor component housing portion.

The capacitive cup may be configured with a capacitive cup chamber formed by a side wall portion and a bottom wall portion to receive and contain the at least one pump motor housing component; and the bottom wall portion may also be configured with corresponding ports formed therein in order to pass the electrical connections from the capacitor cup chamber to the pump and motor component housing chamber, and through the sealable ports of the housing wall into the motor housing chamber for connecting to the motor.

The pump and motor component housing portion may include an upper flange; and the capacitive cup may include a flange portion configured to rest on the upper flange when the capacitive cup is arranged in the pump motor component housing portion.

According to some embodiments, the present invention may also take the form of a submersible pump motor housing assembly, featuring a two-part housing in combination with a capacitive cup.

The two-part housing may include a first housing part and a second housing part. The first housing part may include a motor housing portion and a run and start capacitor housing portion separated by a housing wall with sealable ports formed therein. The motor housing portion may be configured with a motor housing chamber to receive and contain a motor to be arranged therein with oil to be filled to an oil fill line. The run and start capacitor housing portion may be configured with a run and start capacitor housing chamber. The second housing part may be a removable part configured or arranged above the oil fill line to detachably couple to and from the run and start capacitor housing portion.

The capacitive cup may be configured to be received and removeably arranged in the run and start capacitor housing chamber when the removable part is detached from the run and start capacitor housing portion. The capacitive cup may be configured with a capacitive cup chamber formed by a side wall portion and a bottom wall portion to receive and contain at least one run and start capacitor combination to be arranged therein. The bottom wall portion may include corresponding ports formed therein configured to pass electrical connections, which are coupled to at least one run and start capacitor connector of the at least one run and start capacitor combination arranged in the capacitive cup chamber. The electrical connections are passed from the run and start capacitor housing chamber through the corresponding ports, and also through the sealable ports of the housing wall for connection to at least one motor connector of the motor arranged in the motor housing chamber of the motor housing portion.

This submersible pump motor housing assembly may also include one or more of the features set forth above.

BRIEF DESCRIPTION OF THE DRAWING

The drawing, which is not necessarily drawn to scale, includes the following Figures.

Every lead line and associated reference label for every element is not included in every Figure of the drawing to reduce clutter in the drawing as a whole.

DETAILED DESCRIPTION OF THE INVENTION

Figure 1A:
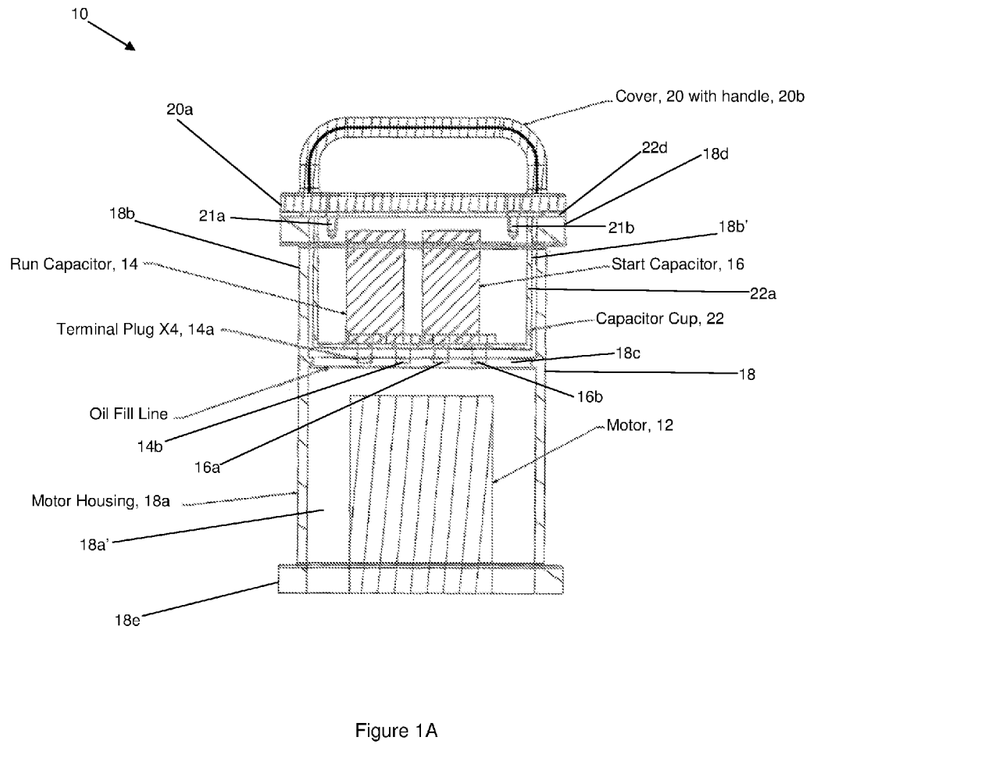
FIGS. 1A and 1B show diagrams in cross-section a submersible pump motor housing, according to some embodiments of the present invention.
Figure 1B:
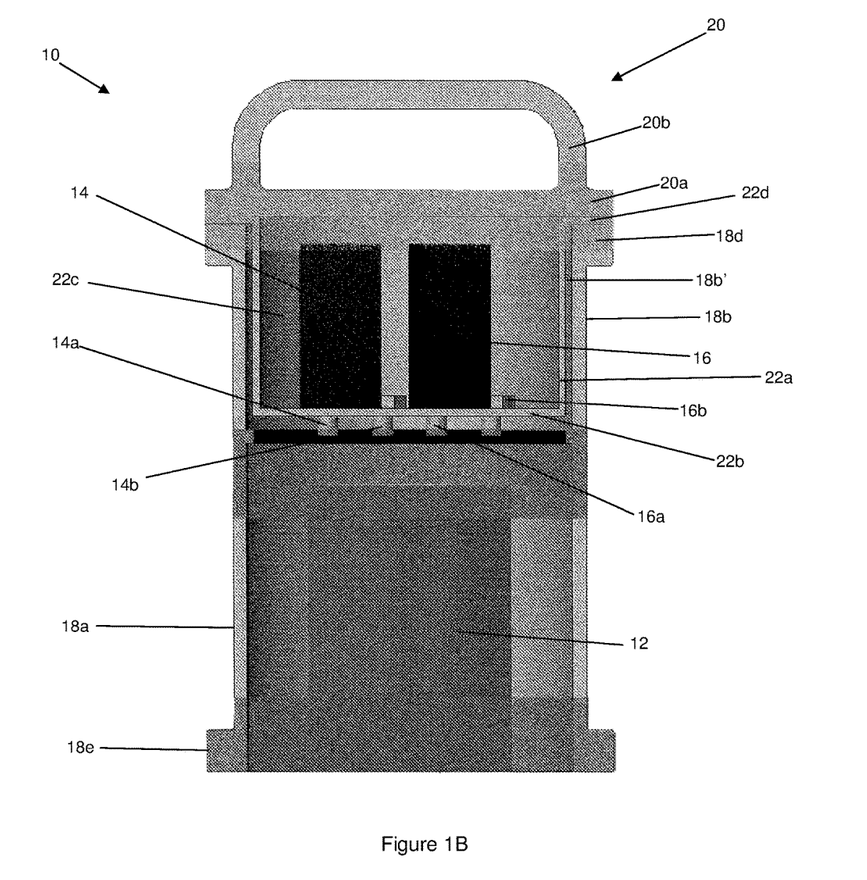
Figure 5:
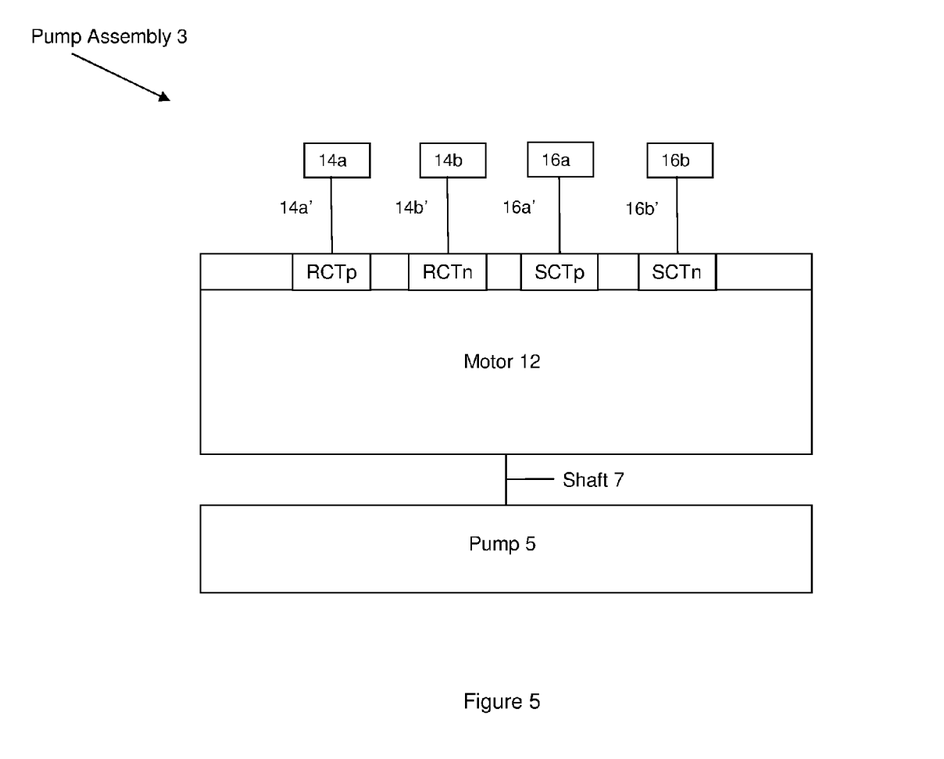
FIG. 5 shows a diagram of part of a pump assembly, including the part where electrical connections between terminal plugs or connectors of the run/start capacitors and positive and negative run and start connections of the motor shown in FIGS. 1A and 1B, according to some embodiments of the present invention.

By way of example, FIGS. 1A and 1B show a submersible pump motor housing assembly generally indicated as 10 according to some embodiments of the present invention, that may form part of a pump assembly generally indicated as 3, e.g., like that shown in FIG. 5, having a pump 5 connected by a shaft 7 to a motor 12. The pump assembly 3 may include a run capacitor 14 and a start capacitor 16, e.g., that may be arranged or configured in one part of the submersible pump motor housing assembly 10, along with other pump motor components set forth herein.

The submersible pump motor housing assembly 10 features a two-part housing having a first housing part 18 in combination with a second removable housing part (i.e., cover) 20, which cooperate as follows:

The first housing part 18 may be configured with a motor housing portion 18a and a pump motor component housing portion 18b separated by a housing wall 18c with sealable ports formed therein. The motor housing portion 18a may be configured with a motor housing chamber 18a' to receive and contain the motor 12 arranged therein with oil filled to an oil fill line (See the "oil fill line" designation in FIG. 1A). The pump motor component housing portion 18b may be configured with a pump motor component housing chamber 18b' (FIG. 1B) configured to receive and contain at least one pump motor housing component arranged therein, e.g., which may include the run capacitor 14 and the start capacitor 16 as shown in FIGS. 1A and 1B, as well as other motor pump components set forth herein.

The second removable housing part 20 may be configured to detach from the pump motor component housing portion 18b in order to insert the at least one pump motor housing component 14, 16 into the pump motor component housing chamber 18b' without draining the oil from the motor housing portion 18a. The second removable housing part 20 may be configured to attach to the pump motor component housing portion 18b in order to close the pump motor component housing chamber 18b' once the at least one pump motor housing component 14, 16 are inserted therein.

According to some embodiments, and consistent with that set forth herein, the removable cover 20 may be configured or arranged above the oil fill line when the motor housing chamber 18a' is filled with the oil. However, it is not necessary that the run capacitor 14 and the start capacitor 16 have their own compartment just that they are in position separate from the oil in the motor housing portion 18a. For example, embodiments are envisioned, and the scope of the invention is intended to include, using a top, bottom, side, or "below the oil line" mounting of these pump motor housing components 14, 16 in relation to the motor 12, which are all captured within the spirit of the basic invention. The thrust of the present invention is to separate the oil-filled motor compartment and the other compartment containing the run and start capacitors and other components, so that the latter pump and motor components may be serviced without draining or drawing down the oil in the motor compartment.

As one skilled in the art would appreciate, the sealable ports may be configured as orifices/apertures formed in the housing wall 18c that separates the two compartments or housing portions 18a, 18b so as to allow a sealed passage of one or more electrical connections between the motor housing portion 18a and the pump motor component housing portion 18b, e.g., consistent with that set forth herein. By way of example, and consistent with that shown in FIG. 5, the one or more electrical connections 14a', 14b', 16a', 16b' may be coupled from the run capacitor 14 and the start capacitor 16, configured to pass through the sealable ports of the housing wall 18c, and connected to the motor 12 arranged in the motor housing chamber 18a' of the motor housing portion 18a. FIG. 5 illustrates the coupling the electrical connections 14a', 14b' between run capacitor connectors 14a and 14b and positive and negative run connect terminals indicated as RCTp, RCTn of the motor 12, and the electrical connections 16a', 16b' between start capacitor connectors 16a and 16b and positive and negative start connect terminals indicated as SCTp, SCTn of the motor 12. (As one skilled in the art would also appreciate, the couplings in FIG. 5 are shown by way of illustration, and it is understood that the positive run and start connector terminals RCTp, SCTp of the motor 12 may be connected to the same motor terminal connection, and that the negative run and start connector terminals RCTn, SCTn of the motor 12 may be connected to the same motor terminal connection.)

Figure 2:
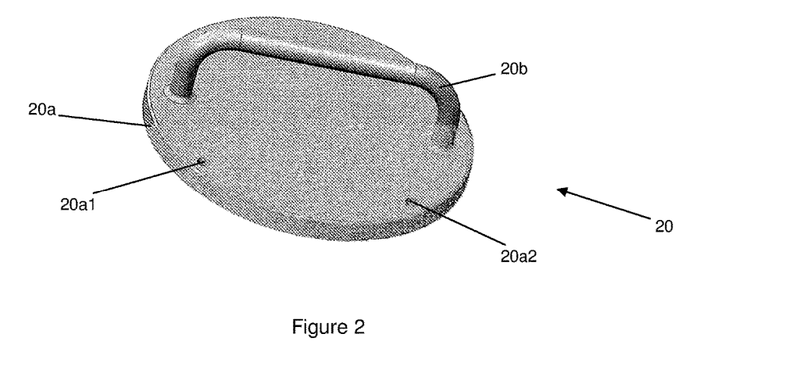
FIG. 2 shows a diagram of a removable cover with a handle of the submersible pump motor housing shown in FIGS. 1A and 1B, according to some embodiments of the present invention.
Figure 4:
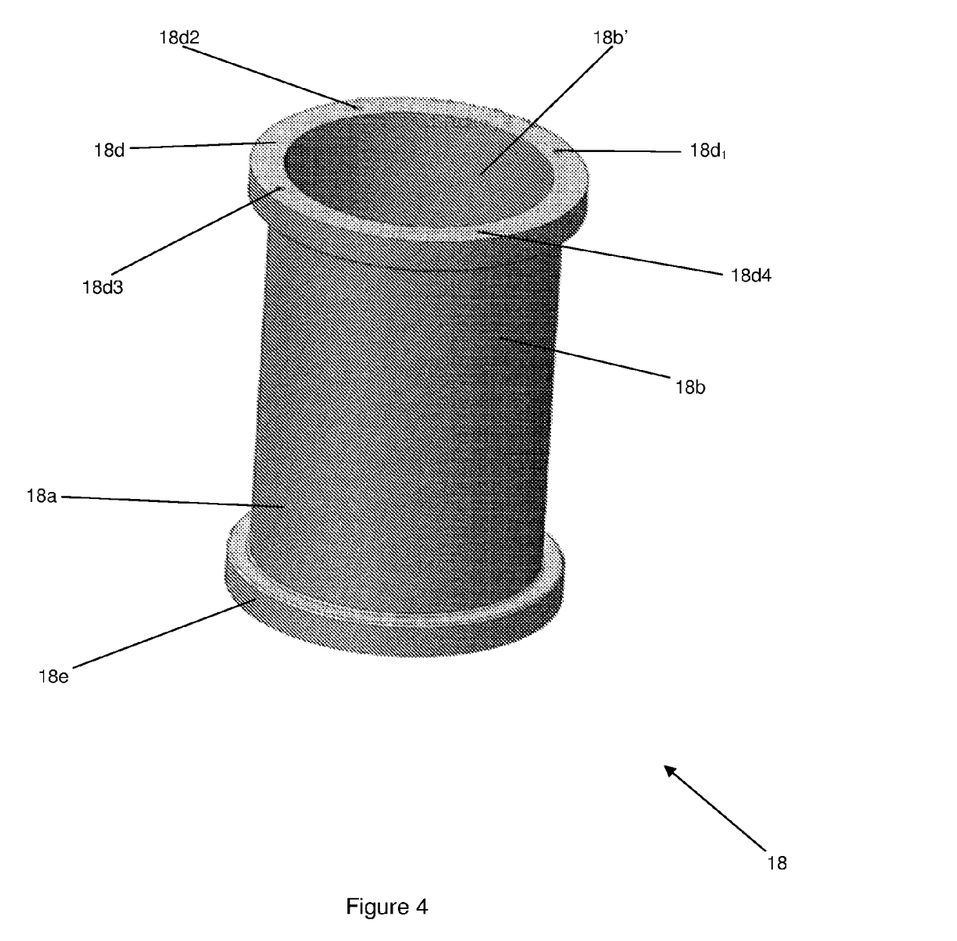
FIG. 4 shows a diagram of a housing of the submersible pump motor housing shown in FIGS. 1A and 1B, according to some embodiments of the present invention.

The pump motor component housing portion 18b may include an upper flange 18d forming a top opening for inserting and removing the run capacitor 14 and the start capacitor 16. The removable housing cover 20 may be configured to fasten to the upper flange 18d to cover and seal the top opening after the run capacitor 14 and the start capacitor 16 are inserted back into the pump motor component housing chamber 18b'. By way of example, the fastening may take the form of using fasteners like 21a, 21b (FIG. 2) that pass through openings 20a1, 20a2 of the removable cover 20 and couple to threaded openings 18d1, 18d2, 18d3, 18d4 formed in the upper flange 18d, e.g., as shown in FIG. 4. Embodiments are envisioned using other types or kind of fastening techniques either now known or later developed in the future. The housing 18 also includes a lower flange 18e, e.g., which may be configured with similar threaded openings for coupling to a pump mounting assembly (not shown).

The submersible pump motor housing assembly 10 may include a sealing agent (not shown) for sealing the sealable ports of the housing wall, including those now known or later developed in the future. By way of example, the sealing agent may include, or take the form of, high temperature epoxies, cements, etc., as well as other types or kind of sealing members that may be configured in an orifice/aperture and allow for the passage of conduit in a sealing manner that are now known or later developed in the future.

According to some embodiments, and consistent with that shown in FIGS. 1A, 1B, 3A and 3B, the submersible pump motor housing assembly 10 may include a capacitive cup 22 configured to receive and contain the at least one pump motor housing component like elements 14, 16. The pump motor component housing chamber 18b' may be configured to receive the capacitive cup 22 when the second removable housing part 20 is detached from the pump motor component housing portion 18b. The capacitive cup 22 may also be configured with a capacitive cup chamber 22c formed by a side wall portion 22a and a bottom wall portion 22b to receive and contain the at least one pump motor housing component 14, 16. The bottom wall portion 22b may be configured with corresponding ports 22b1, 22b2, 22b3, 22b4 formed therein in order to pass the electrical connections like elements 14a', 14b', 16a', 16b' from the capacitor cup chamber 22c to the pump and motor component housing chamber 18b', and through the sealable ports of the housing wall 18c into the motor housing chamber 18a'.

Figure 3A:
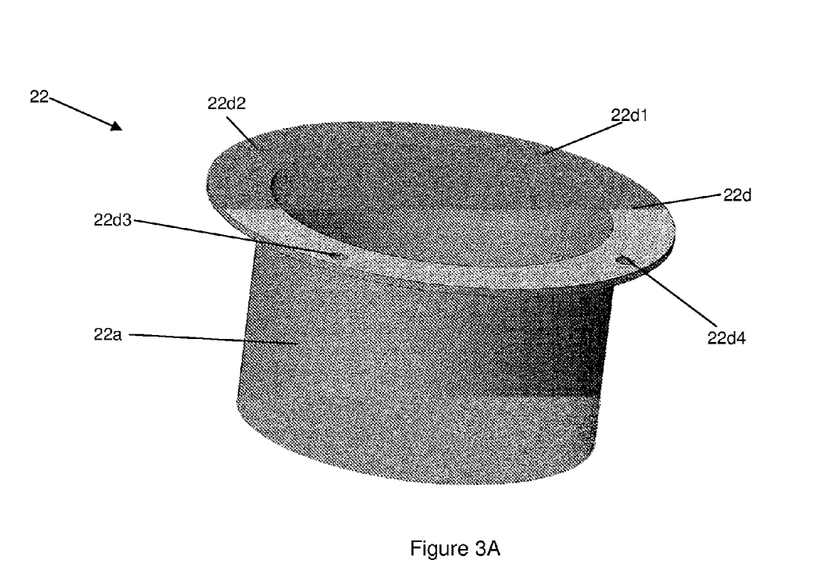
FIGS. 3A and 3B show diagrams in perspective of a capacitor cup of the submersible pump motor housing shown in FIGS. 1A and 1B, according to some embodiments of the present invention.
Figure 3B:
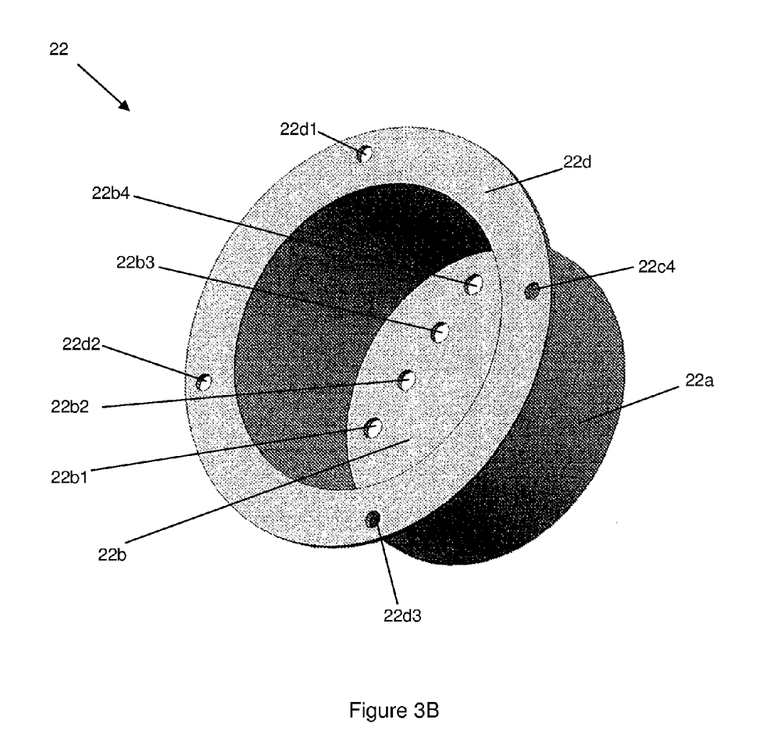

The pump and motor component housing portion 18b may include the upper flange 18d, and the capacitive cup may include a flange portion 22d configured to rest on the upper flange 18d when the capacitive cup 22 is arranged in the pump motor component housing portion 18b. The upper flange 22d may be configured with 22d1, 22d2, 22d 3, 22d 4 formed therein to receive fasteners like 21a,21b when the capacitor cup 22 is configured in the pump and motor component housing chamber 18b', and the removable cover 20 is attached to the housing 18 after the servicing of the submersible pump.

Applications

By way of example, possible applications of the present invention may include its use in relation to one or more of the following:
Pumps,
Compressors and
Motor mounted connection or junction box.

The Scope of the Invention

Further still, the embodiments shown and described in detail herein are provided by way of example only; and the scope of the invention is not intended to be limited to the particular configurations, dimensionalities, and/or design details of these parts or elements included herein. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. A submersible pump motor housing assembly comprising:
    a two-part housing having a first housing part with a motor housing portion and a pump motor component housing portion separated by a housing wall with sealable ports formed therein, the motor housing portion configured with a motor housing chamber to receive and contain a motor to be arranged therein with oil to be filled to an oil fill line, the pump motor component housing portion configured with a pump motor component housing chamber configured to receive and contain at least one pump motor housing component to be arranged therein, the sealable ports configured to pass electrical connections to be coupled from the at least one pump motor housing component through the housing wall to be connected to the motor to be arranged in the motor housing chamber of the motor housing portion; and
    a second removable housing part configured to detach from the pump motor component housing portion in order to insert the at least one pump motor housing component into the pump motor component housing chamber without draining the oil from the motor housing portion, and to attach to the pump motor component housing portion in order to close the pump motor component housing chamber once the at least one pump motor housing component are inserted therein;
    wherein
    the submersible pump motor housing assembly comprises a capacitive cup configured to receive and contain the at least one pump motor housing component;
    the pump motor component housing chamber is configured to receive the capacitive cup when the second removable housing part is detached from the pump motor component housing portion;
    the capacitive cup is configured with a capacitive cup chamber formed by a side wall portion and a bottom wall portion to receive and contain the at least one pump motor housing component;
    the bottom wall portion is configured with corresponding ports formed therein in order to pass the electrical connections from the capacitor cup chamber to the pump and motor component housing chamber, and through the sealable ports of the housing wall into the motor housing chamber;
    the pump and motor component housing portion comprises an upper flange; and
    the capacitive cup comprises a flange portion configured to rest on the upper flange when the capacitive cup is arranged in the pump motor component housing portion.

2. A submersible pump motor housing assembly, comprising:
    a two-part housing having
        a first housing part with a motor housing portion and a run and start capacitor housing portion separated by a housing wall with sealable ports formed therein, the motor housing portion configured with a motor housing chamber to receive and contain a motor to be arranged therein with oil to be filled to an oil fill line, the run and start capacitor housing portion configured with a run and start capacitor housing chamber, and
        a second housing part being a removable part configured above the oil fill line to detachably couple to and from the run and start capacitor housing portion; and
    a capacitive cup configured to be received and removeably arranged in the run and start capacitor housing chamber when the removable part is detached from the run and start capacitor housing portion, the capacitive cup configured with a capacitive cup chamber formed by a side wall portion and a bottom wall portion to receive and contain at least one run and start capacitor combination to be arranged therein, the bottom wall portion having corresponding ports formed therein configured to pass electrical connections to be coupled to at least one run and start capacitor connector of the at least one run and start capacitor combination to be arranged in the capacitive cup chamber, through the run and start capacitor housing chamber, and through the sealable ports of the housing wall to be connected to at least one motor connector of the motor to be arranged in the motor housing chamber of the motor housing portion.

3. A submersible pump motor housing assembly according to claim 2, wherein the run and start capacitor combination comprises a run capacitor and a start capacitor.

4. A submersible pump motor housing assembly according to claim 3, wherein the capacitor cup chamber is also configured to receive and contain one or more of the following: at least start switch, motor mounting hardware, sealing gaskets and a wiring harness.

5. A submersible pump motor housing assembly according to claim 1, wherein
the run and start capacitor housing portion comprises an upper flange forming a top opening for inserting and removing the capacitive cup; and
the second housing part comprises a removable housing cover configured to fasten to the upper flange to cover and seal the top opening after the capacitive cup is inserted into the run and start capacitor housing portion.

6. A submersible pump motor housing assembly according to claim 2, wherein the capacitive cup comprises a flange portion configured to rest on the upper flange when the capacitive cup is arranged in the run and start capacitor housing portion.

7. A submersible pump motor housing assembly according to claim 2, wherein the submersible pump motor housing assembly forms part of a pump assembly, including a vortex pump assembly having a pump.

8. A submersible pump motor housing assembly according to claim 7, wherein the pump is coupled to the motor via a motor shaft.

9. A submersible pump motor housing assembly according to claim 2, wherein the submersible pump motor housing assembly comprises the motor arranged in the motor housing portion, the motor having the at least one motor connector.

10. A submersible pump motor housing assembly according to claim 2, wherein the submersible pump motor housing assembly comprises a sealing agent for sealing the sealable ports.

11. A submersible pump motor housing assembly according to claim 2, wherein the two-part housing is an integral molded construction.

12. A submersible pump motor housing assembly comprising:
a motor;
a run and start capacitor combination having connections configured to couple to the motor; and
a two-part housing having
a first housing part with a motor housing portion and a pump motor component housing portion separated by a housing wall with sealable ports formed therein, the motor housing portion configured with a motor housing chamber to receive and contain the motor arranged therein with oil filled to an oil fill line, the pump motor component housing portion configured with a pump motor component housing chamber to receive and contain the run and start capacitor combination arranged therein, the sealable ports configured to pass through the housing wall the electrical connections to couple and connect the run and start capacitor combination to the motor arranged in the motor housing chamber of the motor housing portion; and
a second removable housing part configured to detach from the pump motor component housing portion in order to insert the run and start capacitor combination into the pump motor component housing chamber without draining the oil from the motor housing portion, and to attach to the pump motor component housing portion in order to close the pump motor component housing chamber once the run and start capacitor combination is inserted therein;
wherein the submersible pump motor housing assembly comprises:
a capacitive cup configured to receive and contain the run and start capacitor combination;
the pump motor component housing chamber is configured to receive and contain the capacitive cup when the second removable housing part is detached from the pump motor component housing portion; and
the capacitive cup configured to be detachable and removeable from the pump motor component housing chamber.

13. A submersible pump motor housing assembly comprising:
a motor;
a run and start capacitor combination having electrical connections configured to couple to the motor; and
a two-part housing having
a first housing part with a motor housing portion and a pump motor component housing portion separated by a housing wall with sealable ports formed therein, the motor housing portion configured with a motor housing chamber to receive and contain the motor arranged therein with oil filled to an oil fill line, the pump motor component housing portion configured with a pump motor component housing chamber to receive and contain the run and start capacitor combination arranged therein, the sealable ports configured to pass through the housing wall the electrical connections to couple and connect the run and start capacitor combination to the motor arranged in the motor housing chamber of the motor housing portion; and
a second removable housing part configured to detach from the pump motor component housing portion in order to insert the run and start capacitor combination into the pump motor component housing chamber without draining the oil from the motor housing portion, and to attach to the pump motor component housing portion in order to close the pump motor component housing chamber once the run and start capacitor combination is inserted therein;
wherein
the capacitive cup is configured with a capacitive cup chamber formed by a side wall portion and a bottom wall portion to receive and contain the run and start capacitor combination; and
the bottom wall portion is configured with corresponding ports formed therein to pass the electrical connections from the capacitive cup chamber to the pump and motor component housing chamber, and through the sealable ports of the housing wall into the motor housing chamber to connect the run and start capacitor combination to the motor.

* * * * *